Patented Dec. 19, 1950

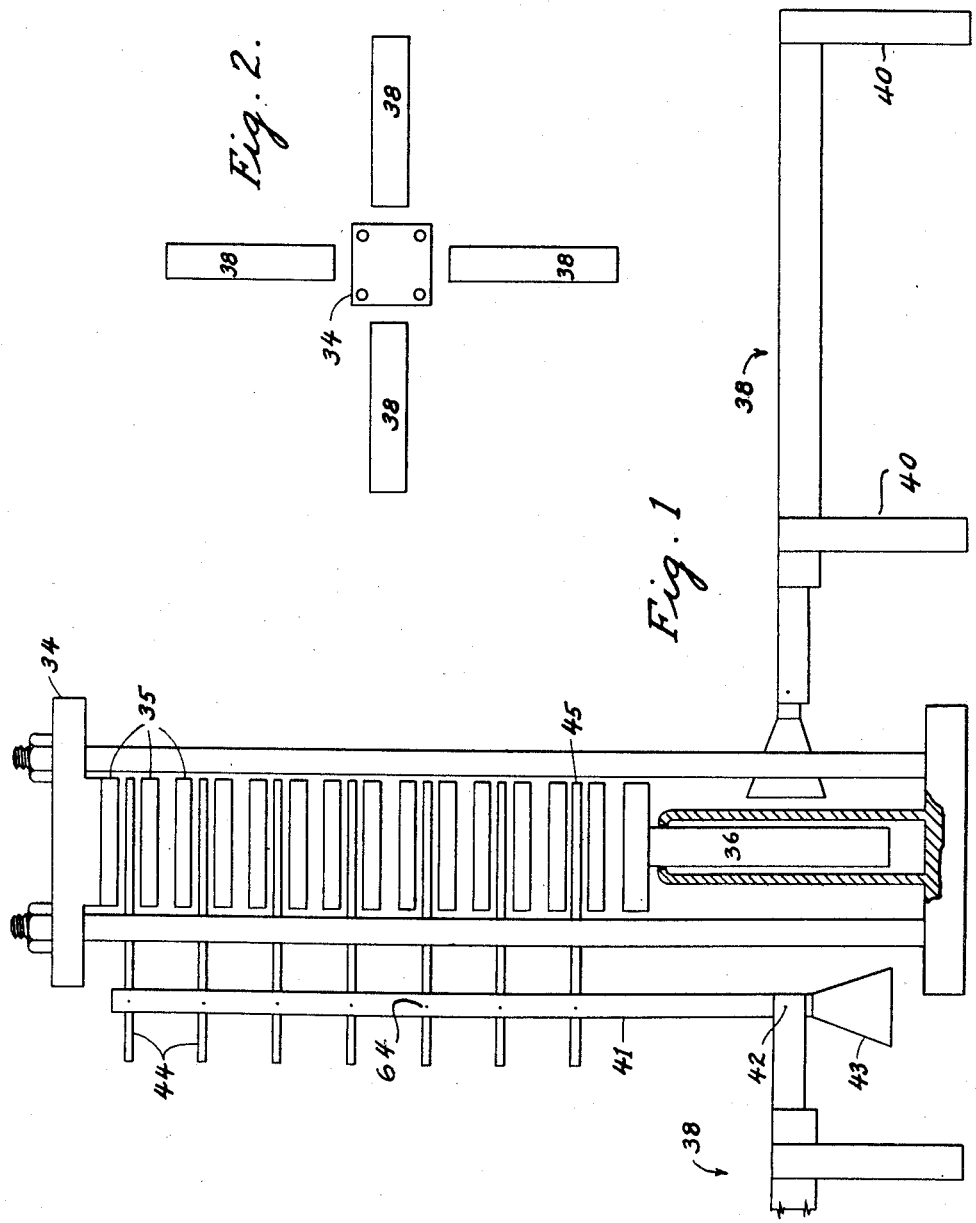

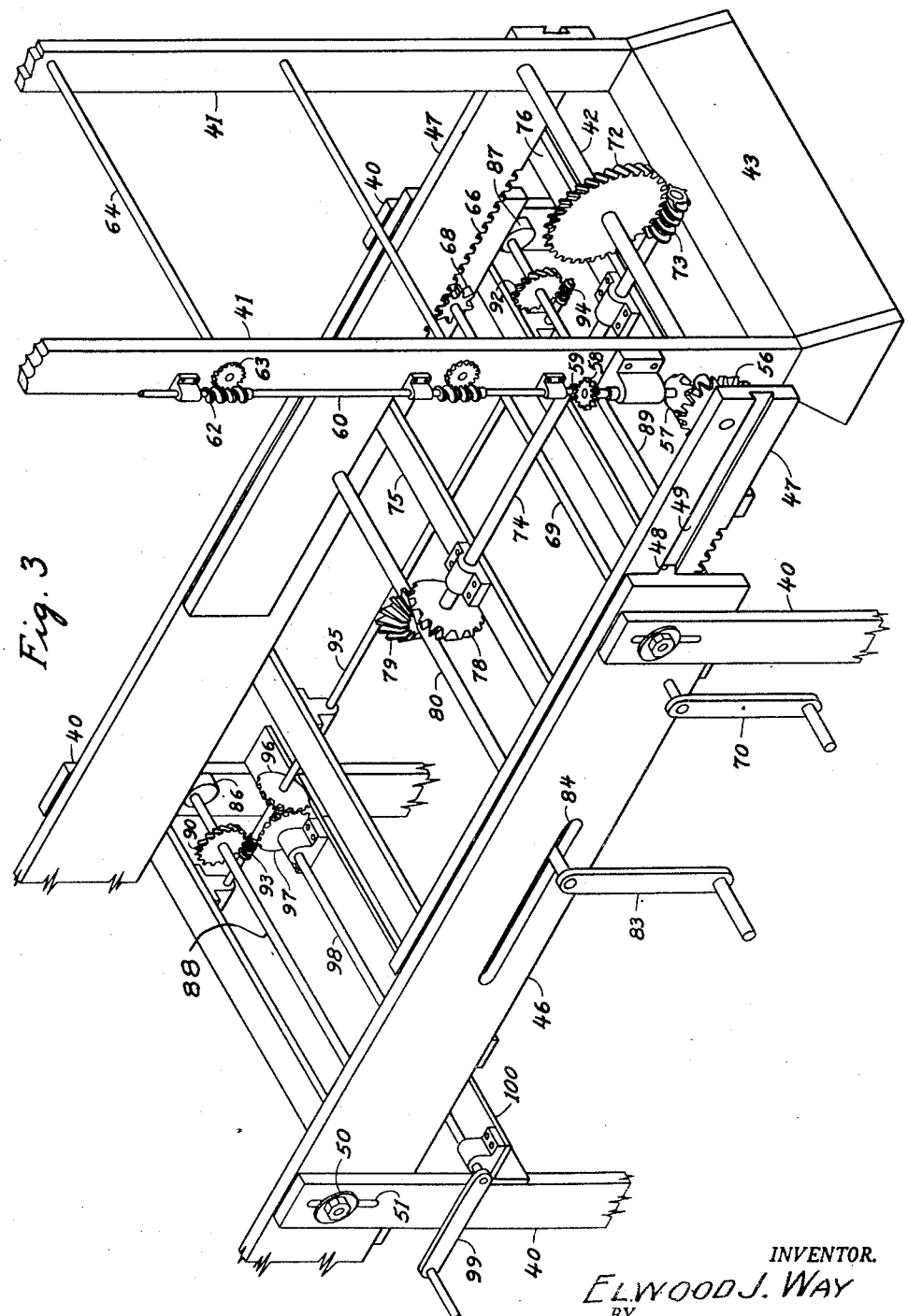

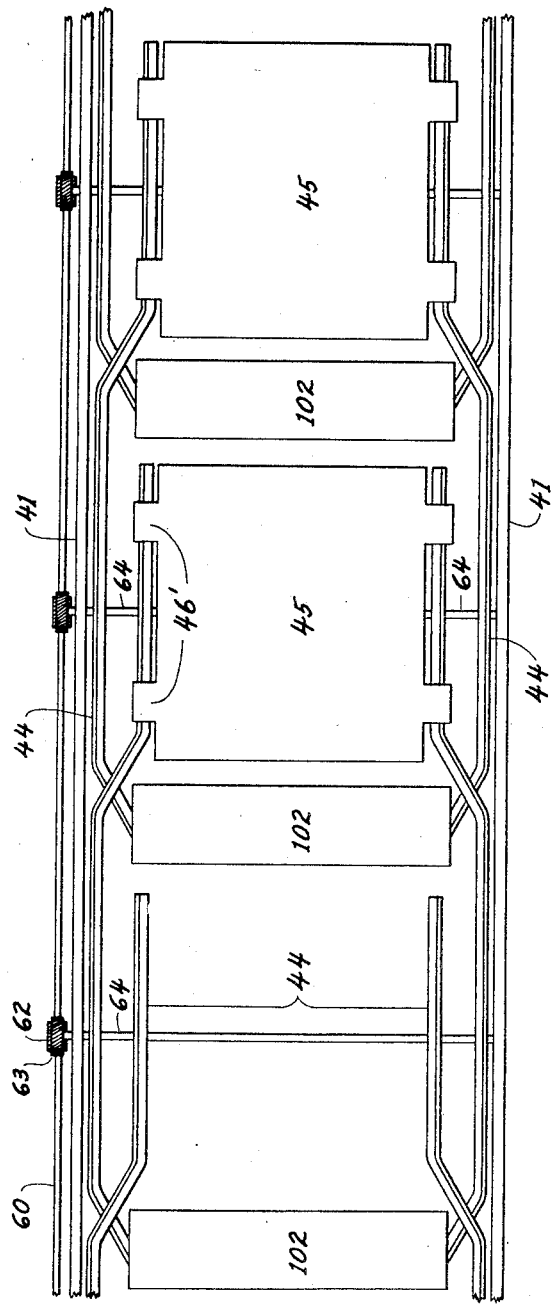

2,534,325

UNITED STATES PATENT OFFICE 2,534,325

MULTIPLE PLATEN PRESS

Elwood J. Way, Washington, D. C.

Application March 28, 1949, Serial No. 83,962

10 Claims. (Cl. 154—1)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to a multiple platen press, and more particularly to such a press having charging and discharging means, and being particularly adapted for the fabrication of composite index strips.

In my application Serial No. 83,961, filed March 28, 1949, entitled "Index Strips," there is described improved index strips and a method of making said strips in which a sheet bearing indicia is firmly incorporated in a laminated structure. The materials to be laminated consist of three or more sheets of transparent thermoplastic material, two or more sheets of paper, one of which bears the indicia, and one or more sheets of wood veneer or other fibrous substance. The first step in the laminating process is the assembly of the various plies in proper sequence. One method consists of laying a sheet of the thermoplastic material on a suitable die; this is followed successively by the sheet bearing the indicia, with the indicia face down, a sheet of thermoplastic material, a sheet of wood veneer or other fibrous substance, and a sheet of thermoplastic material.

The die is provided with parallel cutting members extending between the rows of indicia and suitable positioning means to hold the paper in registration with the cutting edges, so that the severance of the material will be in proper relation to the indicia. The die with its material superimposed is then placed in a press. Heat and pressure are applied to cause the five sheets of material to be laminated, to be integrally bonded together and to cause the die to cut the sheets into strips, except for a margin or stub preferably along the left-hand side. When the heat and pressure have accomplished the bonding and cutting, the die is cooled by the introduction of water or other cooling agent into the press chamber, and when sufficiently cool to handle, the pressure is released and the die and laminated material is removed from the press.

The production of a large quantity of index strips in a press having only one pair of platens would be slow and costly by reason of the time and labor involved. Even with the use of a press having multiplicity of heated platens, time would be lost if the charging procedure were not eficient or if the press must stand idle while the charging mechanism is loaded and unloaded.

It is accordingly an object of this invention to provide a press particularly adapted for the rapid fabrication of laminated or die formed articles.

It is a further object of this invention to provide charging and discharging mechanism for a multiple platen press.

It is also an object of this invention to provide charging and discharging mechanism for a press whereby the press may be in use while the said mechanism is being loaded or unloaded.

Other objects will become apparent from the following specification taken in consideration with the accompanying drawing, in which Fig. 1 is a partial side view of a press and loading mechanism constructed in accordance with the principles of this invention.

Fig. 2 is a schematic plan view of a press and loading mechanism shown in Fig. 1.

Fig. 3 is a partial schematic view of one of the work conveyors shown in Fig. 1.

Fig. 4 is a partial plan view of one of the work conveyors shown in Fig. 1.

In Fig. 1 a press, generally indicated at 34, has a plurality of platens 35. These platens are arranged to be heated by steam, as is known in the art, and there are provided stops (not shown) for spacing the platens 35 at equal distances when no pressure is applied. The bottom platen is connected with a hydraulic ram 36 by means of which pressure may be applied upon work inserted between the platens.

As seen in Figs. 1 and 2, press 34 has located on each of its four sides a work conveying mechanism, indicated generally at 38, for charging and discharging the press 34. Each conveyor mechanism incudes legs 40 and elevating arms 41 pivoted about a shaft 42 to the frame supported by the legs 40. Elevating arms 41 are balanced by a counterweight 43 and carry a plurality of work carrying arms 44. Work carrying arms 44 are pivoted on shaft 64 to elevator arm 41 and are adapted to have the work placed on the outer ends thereof.

A mechanism to be described in detail below is provided to cause the work carrying arms 44 to be always maintained in a horizontal position regardless of the degree of rotation given to the elevator arm 41. There are half as many work carrying arms 44 on one conveyor mechanism 38 as there are spaces between the platens 35. The arms 44 of one conveyor mechanism fit in the alternate spaces between platens 35, and the arms 44 of the opposite conveyor mechanism fit in the intermediate spaces. Hence, it requires two opposite conveyor mechanisms 38 operating simultaneously to fully charge all of the platens of the press 34.

Each conveyor mechanism 38 is provided with mechanism, to be described, for swinging the elevator arms 41 from a horizontal position to a vertical position and for causing the elevator arms 41 to approach and withdraw from the press so that the work may be inserted between the platens and withdrawn therefrom. Mechanism is also provided for causing a slight downward and upward motion of the elevator arm 41 while in its vertical position, so that the work may be deposited on the platen and picked up therefrom.

Although two conveyor mechanisms 38 are required to fully charge the press 34, four are provided, as seen in Fig. 2, so that while two opposite conveyor mechanisms 38 are charging or discharging the press, the piles of sheets of paper, wood veneer and cellulose acetate, required for the index strips, may be simultaneously assembled on the unused conveyor mechanisms 38, and these latter mechanisms may be used to charge the press while the finished work is collected from the other conveyor mechanisms 38.

In using the press, the work is assembled on the carrying arms 44. The elevator arms 41 are swung from the horizontal to a vertical position, during which elevation the work carrying arms 44 remain horizontal and finally extend toward the press 34. The elevator arms 41 are then moved toward the press 34 so that the work carrying arms 44 enter between the platens 35. Elevator arms 41 are then lowered a slight distance of about one-fourth of an inch by means described more in detail below. The work is deposited on the platens 35 by this slight lowering of arms 44 and the elevator arm 41 is backed away from press 34, withdrawing arms 44 and from the platens 35. When the dies 45 are supported by arms 44 and are inserted between the platens 35, the dies are supported less than one-fourth of an inch above their respective bottom platens. The exact manner of support of the dies 45 by the arms 44 will be described more in detail below. A similar process is carried out with the opposite conveyor mechanism 38 which is arranged to insert the work carried thereby between the platens not used by the first carrier mechanism. The second conveyor mechanism 38 is withdrawn, leaving the press mechanism fully charged.

Pressure is applied by hydraulic ram 36 and steam is applied to the platens 35 through the entry of steam by way of conduits (not shown). About 500 pounds of pressure per square inch of bonding surface is required, and about 300° F. of heat. After the bonding and cutting operation is complete, the steam may be turned off and water may be circulated through the hollow platens to hasten their cooling. The pressure is released upon the hydraulic ram 36, and elevator arms 41 on the two opposite conveyor mechanisms 38 are advanced toward the press in their lowered position. When arms 44 have entered between the platens they are raised to pick up the work withdrawn from the press and lowered to a horizontal position.

As seen in Fig. 3, each conveyor mechanism 38 has legs 40 against which side frame members 46 are arranged to slide in a vertical direction. Extending members 47 are slidably attached to side frame members 46 by means of dovetail projections 48 and slots 49. Legs 40 and side frame members 46 are restrained from movement toward or away from each other by struts (not shown). Elevator arms 41 are pivoted by shaft 42 in the outer end of extending members 47. Counterweight 43 is fixed at the end of elevator arms 41. Between one arm 41 of the elevator arms and one extending member 47 is a gear wheel 56 concentric with shaft 42 but fixed against rotation to extending member 47. A gear wheel 57 meshes with gear wheel 56 and rotation thereof causes rotation of gear wheel 58 which in turn meshes with gear wheel 59 and causes rotation of shaft 60. Shaft 60 carries fixed thereto worm gears 62, each of which meshes with a gear wheel 63 keyed to a shaft 64, to which are fixed the work carrying arms 44 (seen in Fig. 1).

It will thus be seen that as elevator arms 41 are rotated to a vertical position, gear 57 will be rotated as it travels over the teeth of fixed gear 56, causing through rotation of gears 58 and 59 a rotation of shaft 60 and worm gears 62. Rotation of worm gears 62 causes rotation of gear wheels 63 and shafts 64. The relation between the number of teeth on gear wheels 56, 57, 58, 59 and 63 and the pitch of worm gears 62 is selected so that arms 44 will remain horizontal regardless of the degree to which arms 41 are rotated.

Extending members 47 carry on the bottom edge thereof a rack 66 engaged by gear wheels 68 keyed to shaft 69, to which is fixed a crank 70. Shaft 69 is journaled in side frame members 46. Rotation of crank 70 will result in rotation of gear wheel 68 and the advancement or retraction of track 66 and extending members 47.

Shaft 42 has keyed thereto a gear wheel 72 meshing with worm gear 73, which is in turn keyed to shaft 74. Shaft 74 is journaled on struts 75 and 76 fastened to the bottom edges of extending members 47. A bevel gear 78 keyed to shaft 74 meshes with a gear 79 keyed to transverse shaft 80. Shaft 80 is journaled in extending members 47 and has keyed to one of its ends a crank 83. The end of shaft 80, carrying crank 83, must necessarily also extend through one side frame member 46, and a slot 84 is provided for that purpose in one side frame member 46 so that shaft 80 may travel horizontally while extending through the member 46. Rotation of hand crank 83 rotates shaft 80, and through bevel gears 79 and 78, shaft 74, worm wheel 73, gear wheel 72 and shaft 42, to which elevator arms 41 are fixed. Thus rotation of hand wheel 83 results in the rotation to a vertical or horizontal position of the elevator arms 41.

Side frame members 46 each rest on cams such as 86 and 87, keyed to shafts 88 and 89. Geared to shafts 88 and 89 are gear wheels 90 and 92, respectively, meshing with worm gears 93 and 94, respectively, each of which is keyed to shaft 95. Shaft 95 is journaled in struts carried by the legs 40. Shaft 95 has keyed thereto a bevel gear 96 which meshes with bevel gear 97 keyed to shaft 98. Shaft 98 is fixed to handle 99 and is journaled in bearings fastened to angle bracket 100 carried by two of the legs 40. Rotation of crank 99 rotates shaft 98, bevel gears 96 and 97, shaft 95, worm gears 93 and 94, gear wheels 90 and 92, shafts 88 and 89, and cams 86 and 87. Rotation of the cams such as 86 and 87 results in a slight upward or downward movement of side frame members 46 with respect to the legs 40. Since only the ends of the side frame members 46 nearest the press need be raised by cams 86 and 87, members 46 may be pivoted to the legs 40 most remote from the press. Cam 86 may have a different curve from that on cam 87 since the ends of frame members 46 nearest the press will be raised the greater distance. Stud bolts 50 screwed into said members 46 and extending through slots 51 in the legs 40 near the press 34 allow the slight upward movement of frame members 46.

In Fig. 4 is shown a part of an elevator arm 41 in a horizontal position with the work carrying arms 44 extending parallel with the elevator arms 41. It will be seen that the end portion 45 of the work carrying arms 44 is counterbalanced by weight 102 which should be not quite heavy enough to exactly counterbalance the arms 44 when the load is on the end 45, so that the weight 102 will not be a completely unbalanced dead weight during the time that the elevator arms 41 are in a vertical position and the work is being acted upon by the press 34.

In Fig. 4 two pairs of the carrying arms 44 are shown carrying cutting and forming dies 45. Dies 45 are adapted to have placed thereon a pile of lamina to be bonded and formed into index strips. Dies 45 have tabs 46' by which they are carried by arms 44. One pair of arms 44 is shown without the die 45.

When the dies 45 are loaded in the press, as explained generally above, the arms 44 are advanced by manipulation of crank 70. When arms 44 are advanced, dies 45 carried by arms 44 enter between the platens 35, each die being held less than one-fourth inch above its respective bottom platen 35. Crank 99 is then manipulated to lower arms 44 about one-fourth inch which allows each die to rest on the platen 35 beneath it, and allows the arms 44 to disengage the tabs 46' of the dies 45. The arms 44 can then be withdrawn leaving the dies 45 resting on platens 35. The dies 45 are removed after the pressing operation by the reverse process. The arms 44 in their lower position being advanced to a position under their respective tabs 46'. The arms 44 are raised by crank 99 to pick up the respective dies 45. The carrying position of dies 45, tabs 46' and arms 44 is best seen in Fig. 4.

It will be seen that the press and the charging and discharging mechanism provided by this invention will allow rapid fabrication of the composite index strips along with efficient use of the press on which the index strips are integrated and cut.

What is claimed is:

1. In combination, a press having a plurality of platens arranged in a vertical column, a conveyor mechanism comprising an elevator arm on one side of said press, said arm being pivoted by a first pivot near one end so that it is adapted to be raised to extend vertically along said column of platens and adjacent thereto and to be lowered to a horizontal position, a plurality of work carrying arms pivoted to said elevator arm, means for maintaining said work carrying arms in a horizontal position regardless of the position of said elevator arm, means for moving said first pivot to and from said press whereby said work carrying arms may be extended between and withdrawn from said platens, and means whereby said first pivot may be slightly raised and lowered while said arm is in its upward position.

2. The combination of claim 1, in which there is a conveyor mechanism of the type described on each of two sides of the press, each conveyor mechanism carrying half as many work carrying arms as there are spaces between the platens.

3. The combination of claim 1, in which there are conveyor mechanisms of the type set forth therein on each of four sides of said press, each conveyor mechanism having half as many work carrying arms as there are spaces between platens.

4. The combination of claim 1, in which the means for maintaining the work carrying arms horizontal comprises a first gear concentric with said first pivot and fixed against rotation, a second gear carried by said elevator arm and meshing with said first gear, whereby rotation of said elevator arm rotates said second gear, and means whereby rotation of said second gear rotates said work carrying arm with respect to said elevator arm.

5. The combination of claim 1, in which said elevator arm and said work carrying arm are counterweighted.

6. The combination of claim 1, in which the elevator arm is pivoted to a horizontally extending member slidably mounted for horizontal movement, said horizontally extending member having a rack meshing with a pinion.

7. The combination of claim 1, in which the means for raising said pivot comprises a frame member slidably mounted for vertical movement and at least one cam bearing thereagainst.

8. In combination, a press having a plurality of platens arranged in a vertical column, a loading mechanism on each of four sides of said press, each loading mechanism comprising an elevator arm, said arm being pivoted near one end so that it is adapted to be raised to extend vertically along said column of platens and adjacent thereto and to be lowered to a horizontal position, a plurality of work carrying arms pivoted to said elevator arm, means for maintaining said work carrying arms in a horizontal position regardless of the position of said elevator arm, means whereby said work carrying arms may be extended between and withdrawn from said platens while said elevator arm is in substantially a vertical position, one of each of said pairs of loading mechanisms having its work carrying arms arranged to enter between alternate pairs of platens, the other of each pair of loading mechanisms having its work carrying arms arranged to enter between intervening pairs of platens.

9. In a loading mechanism for a multiple platen press, an elevator arm, said arm being pivoted near one end so that it is adapted to be raised to extend vertically along said column of said platens and adjacent thereto and to be lowered to a horizontal position, a plurality of work carrying arms pivoted to said elevator arm, means for maintaining said work carrying arms in a horizontal position regardless of the position of said elevator arm, means for moving the pivot of said elevator arm in substantially a horizontal direction, substantially at right angles to the axis of said elevator arm pivot.

10. In combination, a press having a plurality of platens arranged in a vertical column, a conveyor mechanism comprising an elevator arm on one side of said press, said arm being pivoted by a first pivot near one end so that it is adapted to be raised to extend vertically along said column of platens and adjacent thereto, and to be lowered to a horizontal position, a plurality of work carrying arms pivoted to said elevator arm, a gear train for maintaining said work carrying arms in a horizontal position regardless of the position of said elevator arm, a rack associated with said first pivot, said rack cooperating with a crank and pinion for moving said first pivot to and from said press, whereby said work carrying arms may be extended between and withdrawn from said platens, and at least one cam associated with a crank whereby said first pivot may be slightly raised and lowered while said arm is in its upward position.

ELWOOD J. WAY.

REFERENCES CITED

The following references are of record in the file of this patent:

UNITED STATES PATENTS

| Number | Name | Date |
|---|---|---|
| 709,285 | Wilkes | Sept. 16, 1902 |
| 1,939,014 | Locher | Dec. 12, 1933 |